(12) United States Patent
Hult

(10) Patent No.: US 9,027,717 B2
(45) Date of Patent: May 12, 2015

(54) CAM-ACTUATED CENTRIFUGAL BRAKE FOR PREVENTING BACKSPIN

(75) Inventor: Vern A Hult, Calgary (CA)

(73) Assignee: Oil Lift Technology Inc., Calgary (CA)

( * ) Notice: Subject to any disclaimer, the term of this patent is extended or adjusted under 35 U.S.C. 154(b) by 1736 days.

(21) Appl. No.: 12/095,984

(22) PCT Filed: Dec. 14, 2006

(86) PCT No.: PCT/CA2006/002044
§ 371 (c)(1),
(2), (4) Date: Jun. 3, 2008

(87) PCT Pub. No.: WO2007/068118
PCT Pub. Date: Jun. 21, 2007

(65) Prior Publication Data
US 2008/0296011 A1    Dec. 4, 2008

(30) Foreign Application Priority Data
Dec. 14, 2005   (CA) .................................... 2530782

(51) Int. Cl.
| | |
|---|---|
| F16D 59/00 | (2006.01) |
| F04C 15/00 | (2006.01) |
| E21B 43/12 | (2006.01) |
| F16D 51/48 | (2006.01) |
| F16D 65/22 | (2006.01) |
| F04C 2/107 | (2006.01) |
| F16D 121/16 | (2012.01) |

(52) U.S. Cl.
CPC ........... *F04C 15/0084* (2013.01); *E21B 43/126* (2013.01); *F04C 2/107* (2013.01); *F16D 51/48* (2013.01); *F16D 65/22* (2013.01); *F16D 2121/16* (2013.01)

(58) Field of Classification Search
USPC ............................. 188/184, 24.17, 325–330
See application file for complete search history.

(56) References Cited

U.S. PATENT DOCUMENTS

| | | | | |
|---|---|---|---|---|
| 1,749,624 A | * | 3/1930 | Batson | 188/323 |
| 1,908,228 A | * | 5/1933 | Dotson | 188/323 |
| 2,072,852 A | * | 3/1937 | Batten et al. | 192/75 |
| 2,268,605 A | * | 1/1942 | Mattersdorf | 188/362 |

(Continued)

FOREIGN PATENT DOCUMENTS

| | | |
|---|---|---|
| CA | 2074013 | 1/1994 |
| CA | 2171899 | 10/1996 |
| CA | 2311036 | 12/2001 |

OTHER PUBLICATIONS

European examination Report 06840471.4, dated Apr. 9, 2009.
(Continued)

*Primary Examiner* — Robert A Siconolfi
*Assistant Examiner* — James Hsiao
(74) *Attorney, Agent, or Firm* — Goodwin Law; Sean W Goodwin

(57) ABSTRACT

A cam assisted centrifugal brake or clutch system provides increased mechanical advantage to improve the output torque relative to prior art devices such as leading brake shoes. The brake or clutch engagement is cammed radially outwardly to engage a brake housing in one direction and guided to a disengaged position in the other direction. Centrifugal forces retain the brake in the disengaged position. Embodiments of the present invention are applied as a backspin braking system that is incorporated into a drive head for a progressing cavity pump drive system.

26 Claims, 15 Drawing Sheets

(56) References Cited

U.S. PATENT DOCUMENTS

| | | | | |
|---|---|---|---|---|
| 2,547,864 | A | * | 4/1951 | Hall .......................... 192/217.6 |
| 3,432,013 | A | * | 3/1969 | Matsumoto Shuzo ..... 192/217.4 |
| 3,485,109 | A | | 12/1969 | Dunlap |
| 4,134,481 | A | * | 1/1979 | Calderazzo ................ 192/217.1 |
| 4,144,853 | A | | 3/1979 | Maruoka et al. |
| 4,797,075 | A | | 1/1989 | Edwards et al. |
| 4,981,200 | A | * | 1/1991 | Gee ............................... 188/341 |
| 5,027,930 | A | * | 7/1991 | Reed .......................... 192/217.2 |
| 5,358,036 | A | | 10/1994 | Mills |
| 5,535,855 | A | * | 7/1996 | Hanada ..................... 188/24.14 |
| 5,551,510 | A | | 9/1996 | Mills |
| 5,673,773 | A | * | 10/1997 | Lai ............................. 188/24.17 |
| 6,079,489 | A | | 6/2000 | Hult et al. |
| 6,290,028 | B1 | * | 9/2001 | Liu ................................. 188/26 |
| 2002/0128111 | A1 | * | 9/2002 | Shoge .......................... 475/289 |

OTHER PUBLICATIONS

Communication under Rule 71(3) EPC—Intent to Grant, dated May 9, 2011.

Australian Examination Report—dated Mar. 9, 2011.

* cited by examiner

CAM-ACTUATED CENTRIFUGAL BRAKE FOR PREVENTING BACKSPIN

FIELD OF THE INVENTION

The present invention relates generally to improvements in centrifugal clutch and brake systems and more particularly to a backspin braking system for incorporation into a drive head for a progressing cavity pump drive system.

BACKGROUND OF THE INVENTION

The importance of backspin braking systems in surface pump drive systems for downhole rotary pumps, particularly progressing cavity pump (PCP) drive systems for oil or water wells, is well known in the art. Surface drive systems for PCPs are generally called wellhead drives, drive heads, surface drives or drives.

Wellhead drives for PCPs, at surface, rotate in a forward direction to rotate sucker rods extending down a well which turn a rotor inside a stator at a bottom of the well to pump fluids from the well. When a drive is shut down, energy is released. The energy that is released includes the spring energy stored in the wind-up of the sucker rods and the fluid energy stored in the height difference between the fluid in the production tubing and the fluid in the annulus between the production tubing and the casing. Wellhead drives for progressing cavity pump systems generally include a backspin braking system to control the backspin speed to a safe limit while absorbing and dissipating the energy. The safe speed is determined by the speed rating of the drive head, the power transmission system, or the prime mover.

Commonly, sheaves and belts are used to transmit power from the prime mover to the drive head. If sheaves turn fast enough, such as during uncontrolled backspin, they will shatter due to tensile stresses in the rim resulting from centrifugal forces. Fragments from shattered sheaves are very dangerous to operating personnel. Due to such personnel hazards, backspin braking systems must be designed to be very reliable.

Applicant believes that, until commercial production by Weatherford in 1998 of the centrifugal braking system patented by Hult et al, U.S. Pat. No. 6,079,489, all major manufacturers produced drive heads that required hydraulic pumping to achieve braking. Two major types of braking systems were common; hydraulic and hydraulic actuated. The hydraulic type uses a form of hydraulic pump and restricts output flow in the backspin direction to apply braking torque. Hydraulic type centrifugal braking drives have been produced by Griffin Legrand, Weatherford Corod and Weatherford BMW. The hydraulic-actuated type use a small hydraulic pump to actuate a disc brake in the backspin direction. These types of drives were patented by Mills CA 2,074,013 and U.S. Pat. No. 5,358,036 and are produced by Kudu Industries Inc., Calgary, Alberta, Canada and Weatherford BMW. Since 1998, a hydrodynamic braking system patented by Belcher, CA 2,171,899 was introduced by Corlac Industries of Lloydminster, Alberta, Canada and is now produced by National Oil Well VARCO of Houston, Tex., USA. All braking systems that are based on pumping a fluid hydrostatically or hydrodynamically are vulnerable to failure due to no oil, cold oil or the wrong oil. There are also a number of other modes of failure that are known in the industry based on many years of experience with thousands of fluid pumping based braking systems.

Applicant has provided prior art centrifugal brake systems. Canadian application 2,311,036 described a centrifugal brake referred to as a leading shoe design. Because the brake shoe leads the brake shoe pivot, the friction force between the brake shoe and the brake drum tends to force the brake shoe into the drum. The braking effect using a leading shoe geometry is about 150% of the braking effect based on centrifugal force only, known as a braking multiplier, the principles of which are well understood by those skilled in the art A ball drop principle is used to engage the brake in a backspin direction and disengage the brake in a forward direction. As the engagement system acts on the brake driving hub, the engagement system has no effect on the braking multiplier.

U.S. Pat. No. 6,079,489 to Applicant describes a brake which is actuated by a cam surface built into the actuator hub which actuates on backspin by pushing in a radially outward direction against an inner flat surface of a brake shoe. The line of action of the contact force between the cam and the flat surface is radial and tangential. The tangential component is due to friction between the cam and the flat surface. The cam and the flat surface are oil lubricated plane surfaces and therefore the friction coefficient would be in the order of 0.2 and the line of action of the contact force is approximately 30 degrees off radial. As the cam angle approaches the line of action, the brake multiplier effect gets larger and larger, until the brake locks up. Locking up is not acceptable on a wellhead drive since it is important to let the rods continue to turn and release the energy from the well. In practice, this device is limited to a brake multiplier effect of 2.0 to 2.5.

Ideally a centrifugal braking system is desired which is capable of preventing backspin, is not prematurely engaged, permits dissipation of stored energy without locking up and which is capable of withstanding significant amounts of torque, such as for use in a wellhead drive of a progressive cavity pump.

SUMMARY OF THE INVENTION

Embodiments of the present invention provide improvements to a centrifugal braking system to ensure cam engagement to increase reliability and output torque and having means to avoid premature actuation.

Centrifugal braking systems are used to retard backspin as there are fewer modes of failure than fluid pumping-based braking systems. Centrifugal braking systems better meet the need for fail safe braking because high speeds induce high centrifugal forces and these forces result in higher braking torque, when the brake is reliably engaged.

Embodiments of the invention are distinguished over prior art centrifugal brake systems making the brake more reliable and increasing output torque. Various embodiments provide an improved cam arrangement and other embodiments provide a cam profile or surface which prevents the brake from actuating in the forward direction despite variations in angular momentum. Further, a cam follower can comprise anti-friction members, preferably rolling element bearings, which aid in permitting a higher multiplier of centrifugal effect to provide more torque, further allowing use of a smaller brake drum diameter than would be possible with prior art. Also, the brake shoes are axially supported on the brake hub by anti-friction means, preferably rolling anti-friction bearings, to minimize restrictions on the engagement of the braking system under very low acceleration conditions which may occur after the use of variable frequency drive (VFD) braking.

Therefore in a broad aspect of the invention a centrifugal brake system for retarding backspin comprises: a main rotatable shaft extending axially through a brake housing; a hub supported for co-rotation by the shaft and rotatable concentrically in the brake housing; two or more brake shoes distributed circumferentially about the hub, each brake shoe movable radially between a biased, radially inward disengaged position, the brake shoes retained thereat when the shaft rotates in a forward direction, and an engaged position in braking engagement with the brake housing, when the shaft rotates in a backwards direction; and a cam arrangement acting between the two or more brake shoes and the hub comprising: two or more arcuate cam surfaces extending circumferentially between a radially inward end and a radially outward end; and two or more cam followers, each cam follower operatively engaging each cam surface for actuating the brake shoes between the disengaged position in the forward direction and the engaged position in the backward direction.

In embodiments of the invention, the cam surfaces are formed in the hub and the cam followers extend axially from the brake shoes. The cam surface can further comprise an outer guiding surface for forming a slot, the pocket being formed at the radially inward end of the slot. Optionally, the outer guiding surface may be discontinuous comprising a ramp adjacent the pocket for ensuring re-engagement of the cam follower with the cam surface and the pocket. In other embodiments the cam surfaces are formed in the brake shoes and the cam followers extend axially from the hub. In this case, the cam surface can further comprise an inner guiding surface for forming the slot, the pocket being formed at the radially outward end of the slot.

In embodiments of the invention the position of the cam followers relative to the shaft permits greater brake multiplier effects than with prior art systems. An angle σ defined by a line drawn through a center of a drive shaft and a point of contact of the cam follower with the inner cam engagement surface and a line drawn between the point of contact and the center of the rolling cam follower 2 is less than 90° and in an embodiment of the invention is about 15°.

BRIEF DESCRIPTION OF THE DRAWINGS

FIG. 2 is a cross-sectional view of the centrifugal backspin retarder;

FIG. 3 is a plan view according to FIG. 2;

FIG. 4 is a partial cross-sectional view according to FIG. 2 in an engaged position; and FIG. 5 is a partial cross-sectional view according to FIG. 2 in a disengaged position; FIG. 6 is a longitudinal cross-sectional view illustrating the prior art backspin retarder;

FIG. 7 is a cross-sectional view according to FIG. 6, the retarder in an inactive or disabled position; and FIG. 8 is a cross-sectional view according to FIG. 6, the retarder in an active or braking position;

DETAILED DESCRIPTION OF PREFERRED EMBODIMENT

Figure 1:
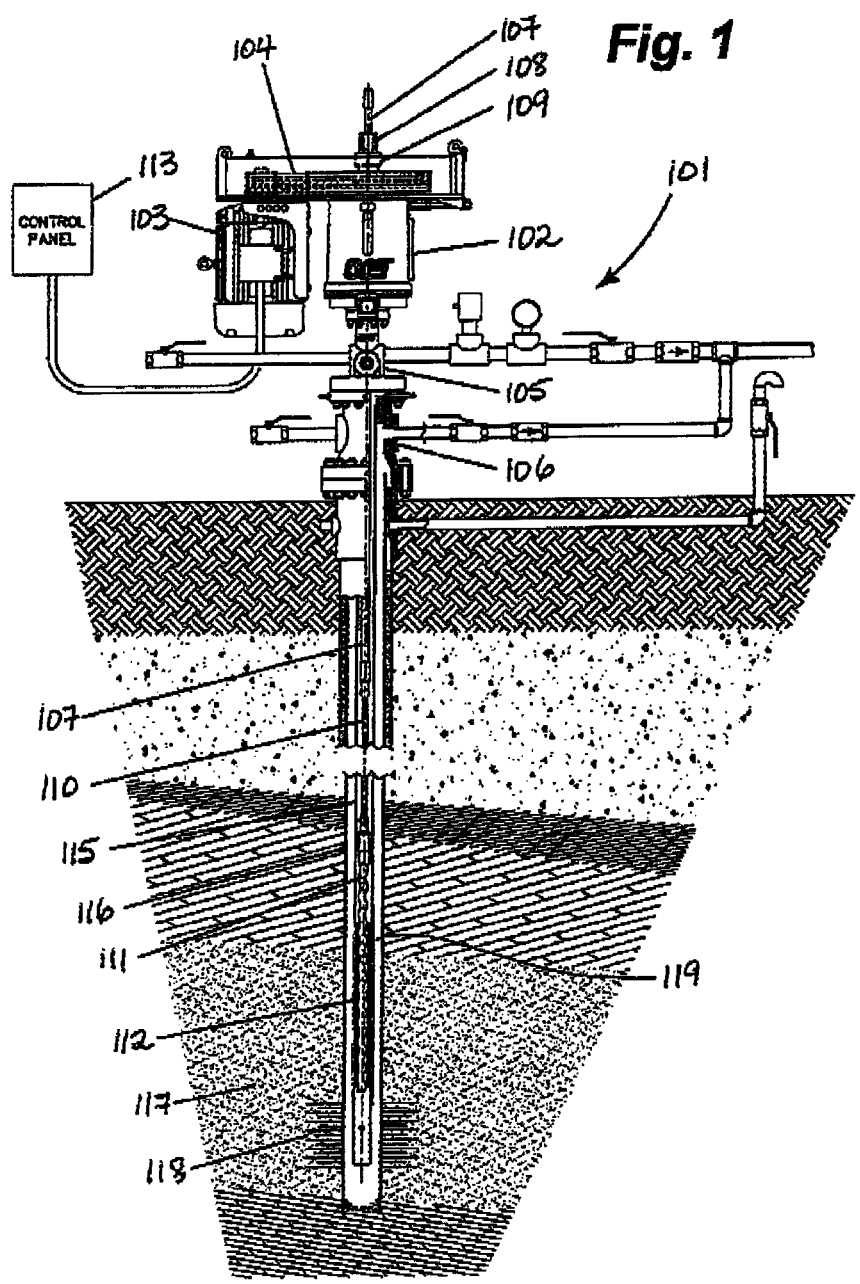
FIG. 1 is an elevation and partial cross-sectional view of a conventional progressing cavity pump (PCP) installation and drivehead.
Figure 2:
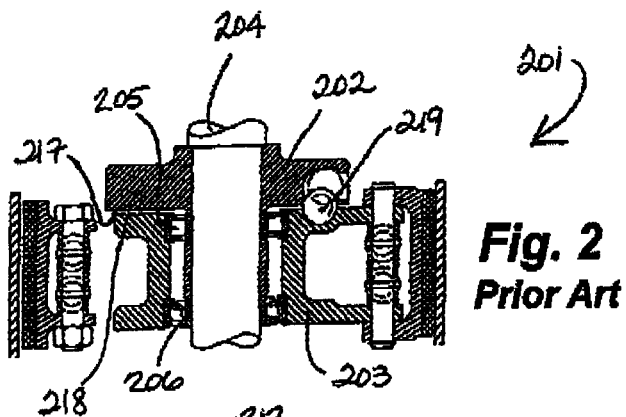
FIGS. 2-5 illustrate a prior art backspin retarder according to Canadian patent application 2,311,036. More particularly.
Figure 3:
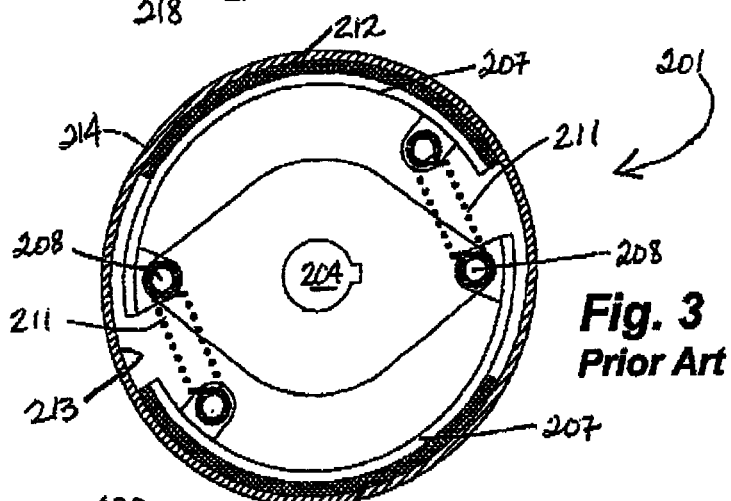
Figure 4:
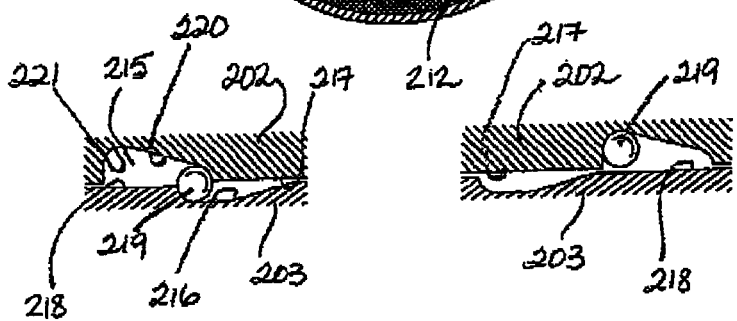

As shown in FIGS. 9-20, embodiments of the invention provide improvements to prior art centrifugal braking systems. In one embodiment the backspin retarder or braking system 1 comprises a cam follower 2 and at least a cam surface 3 for actuating brake shoes 6 to an engaged braking position. The cam surface can have a pocket 4 formed at a radially inward end 5 of the cam surface 3 for centrifugally engaging the cam follower 2 therein for maintaining the brake shoes in a disengaged position during normal operation and further, for preventing premature actuation of the braking system 1, such as during a rapid deceleration while still rotating in a forward direction (F). Thus, brake shoes 6 housed within the brake system 1 are permitted to move radially outward to an outward disengaged position under normal forward rotation F at operating speeds wherein the brake shoes 6 do not engage a braking lining 7 with the housing 8. For the purposes of illustration, a forward direction F is clockwise when viewed in plan, such as FIG. 10.

Preferably, the cam follower 2 further comprises anti-friction members 26, such as rolling friction bearings.

Figure 12:
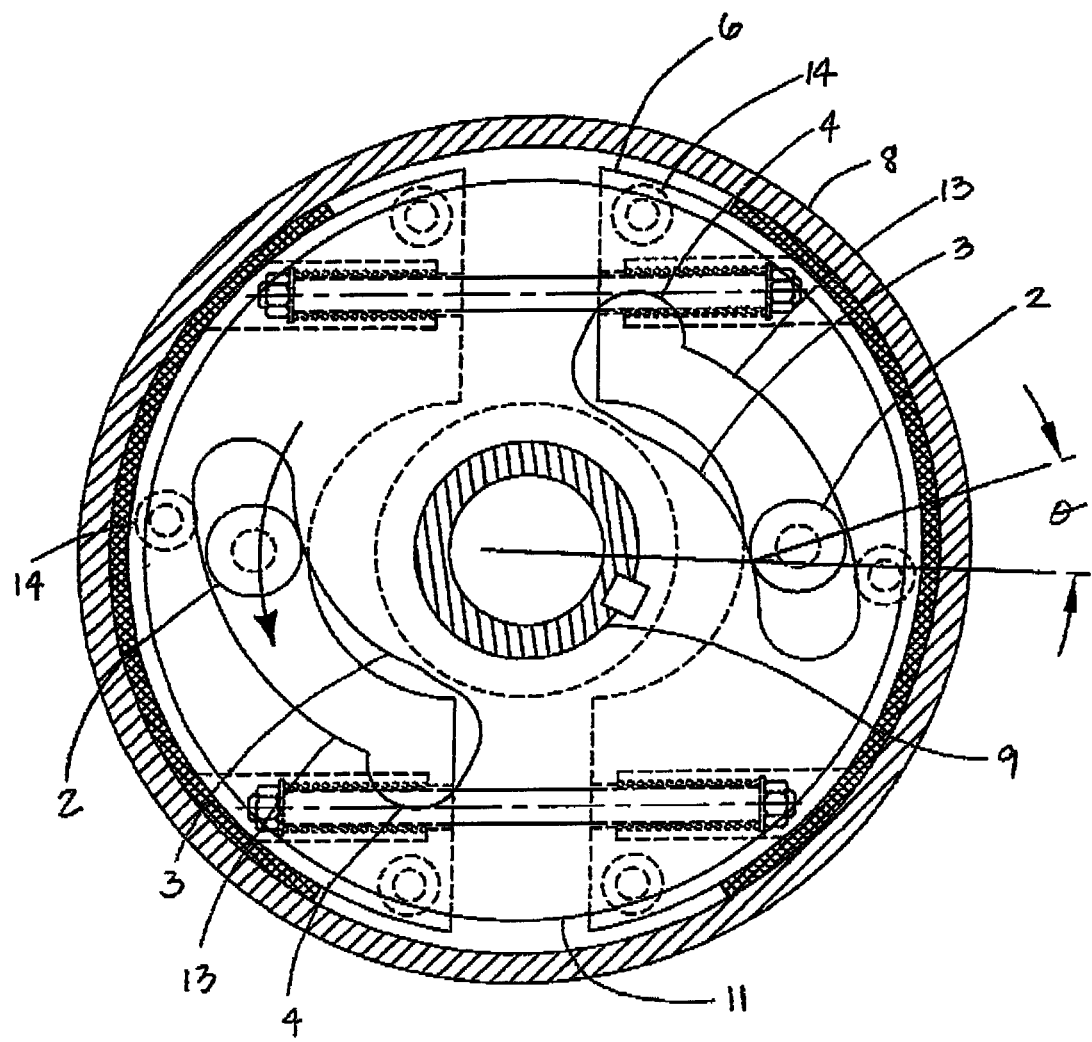
FIG. 12 is a plan view according to FIG. 9 in an engaged position braking.
Figure 14:
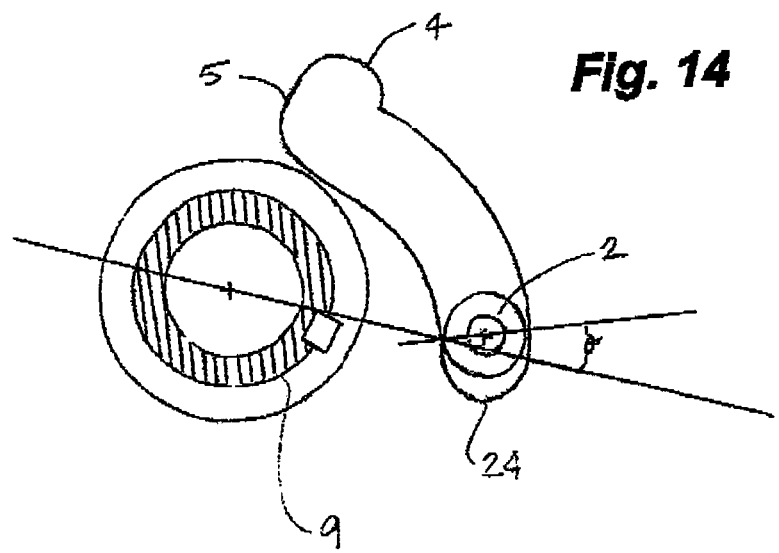
FIG. 14 is a partial plan view according to an embodiment of the invention illustrating an angle between the cam follower and the shaft permitting increased brake multiplier effects.

Further, as shown in FIGS. 12 and 14, the cam follower 2 is movable along at least the cam surface 3 for engaging the brake shoes 6 in an engaged or braking position in a backspin direction B, such that a high brake multiplier effect is permitted before self locking occurs. An angle σ defined by a line drawn through a center of a drive shaft 9 and a point of contact 10 of the cam follower 2 with the inner cam engagement surface 3, and a line drawn between the point of contact 10 and the center of the rolling cam follower 2 is less than 90°. In an embodiment of the invention the angle σ is about 15°.

While the following disclosure is primarily directed toward application of a centrifugal braking system for a wellhead drive and particularly to prevent backspin therein, embodiments of the invention may be applied to other applications, including but not limited to a centrifugal clutch, a centrifugal brake, a one-way engagement system, an engagement system for a clutch or brake, and other general applications where it might be applied by one skilled in the art.

Progressive Cavity Pump Installation

FIG. 1 illustrates a known typical progressive cavity pump (PCP) installation 101. The installation 101 includes a progressing cavity pump wellhead drive 102, a prime mover, in this case an electric motor 103, a belt and sheave drive system 104, all of which are mounted on a blow out preventor (BOP) 105 with an integral flow tee, generally known as a BOP/flow tee. The BOP/flow tee is mounted on a wellhead 106. The wellhead drive 102 supports and drives a drive shaft 107, generally known as a "polished rod". The polished rod 107 is supported and rotated by means of a polished rod clamp 108, which engages an output shaft 109 of the wellhead drive 102 by means of milled slots (not shown) in both parts. The polished rod 107 drives a rod string 110, which in turn, drives a rotor, 111, inside a stator, 112. The rotor and stator 111,112 together are called the progressive cavity pump (PCP). The electric motor 103 is typically controlled from a control panel 113, which typically uses an on-off switch or alternatively, a variable frequency drive (VFD). The stator 112 of the PCP 101 is connected to the production tubing 115 which extends into a wellbore. Casing 116 is cemented into the wellbore drilled in the formation 117, the casing having perforations 118 which fluidly connect the wellbore with the producing formation 117. The distance between a top of the wellhead 106 and fluid inside an annulus 119 between the production tubing 115 and the casing 116 is called the fluid level.

In operation, the wellhead drive 102 rotates in a forward direction until the prime mover 103 shut down. Torque applied to the rod string 110 causes the rod string 110 to store elastic energy in the form of strain energy in the rod string 110. Additional energy is stored in the form of potential energy in the produced fluid due to the difference between a fluid height at the wellhead drive 102 and the fluid level in the annulus 119 between the production tubing 115 and the casing 116. As soon as the prime mover 103 is shut down, there is no longer torque applied by the wellhead drive 102 in the forward direction. However, rod torque due to strain energy in the rod string 110 causes the rod string 110 and the wellhead drive 102 to quickly slow down and then rotate in a reverse or backspin direction. Further, as the fluid level equalizes between the annulus 119 and the inside of the tubing string 115, the fluid drives the pump rotor 11 in reverse and additional energy is imparted into the rod string 110. Generally a backspin brake is built into the wellhead drive 102 to retard the backspin speed and absorb and dissipate the energy. The present invention is directed toward a braking system built which is particularly suited for use in the wellhead drive 102 of such a PCP installation.

Prior Art Braking Systems

Applicant has previously provided centrifugal braking solutions as shown in Canadian patent application 2,311,036, filed Jun. 9, 2000 and shown herein at FIGS. 2-5. The prior art centrifugal brake assembly 201 is comprised of a driving hub 202 and an alternately driven hub 203. The driving hub 202 is non-rotatably connected to the input shaft 204. The driven hub 203 is mounted for alternating free or driven rotation on the input shaft by an upper roller bearing 205 and a lower thrust bearing assembly 206.

One end of each of a pair of brake shoes 207 are pivotally connected to the driven hub by pivot pins 208. A pin 209 on the other end of each of one brake shoe is connected to an adjacent pivot 210 of the other brake shoe by a helical tension spring 211 so as to bias the brake shoes 207 radially inwardly toward respective unlocked positions. Brake linings 212 are secured to the outer arcuate sides of the brake shoes 207 for frictional engagement with the inner surface 213 of a drive head housing 214.

Figure 5:
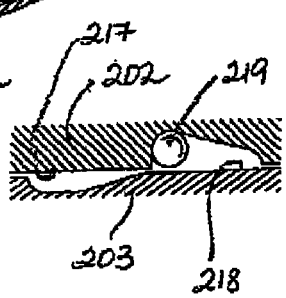

One end of each brake shoe 207 is fixed to the driven hub 203 by means of one of the pivot pins 208. The other end of each brake shoe 207 is free to move inwardly. The driving and driven hubs 202,203 are formed with respective grooves 215, 216 in adjacent surfaces 217,218 for receiving drive balls 219, of which only one is shown. The groove 215 in the driving hub 202 is formed with a ramp or sloped surface 220 which terminates in a ball chamber 221 in which the drive ball 219 is located when the drive shaft 204 rotates in a forward direction. Centrifugal force holds the drive ball 219 radially outward and upward in the ball chamber 221 so there is no ball motion or contact with the driven hub 203 while rotation of the driving hub 202 is rotating in the forward direction (FIG. 5). When the drive shaft 204 rotates in a reverse direction (FIG. 4), the drive ball 219 moves downward to a position in which it engages and locks both hubs 202,203 in together and the driving hub 202 rotationally drives the driven hub 203.

When the drive head starts to turn, the drive ball 219 rests on the driven hub 203 and the drive ball 219 rides up the ramp 220. As the speed increases, the drive ball 219 jumps slightly above the ramp 220 and is thrown up into the ball chamber 221, where it is held by centrifugal force. When the electric motor turning the drive head is shut off, the drive head stops and the drive ball 219 drops into the groove 216 in the driven hub 203. The spherical surface of the driving hub 202 wedges the drive ball 219 against the spherical surface of the driven hub 203 thus starting the brake shoes 207 turning.

The reverse ramp of the driving hub 202 serves an important function associated with the centrifugal brake. The centrifugal brake 201 has no friction against the housing 214 until the brake 201 turns fast enough to overcome the brake retraction springs 211. If the driving hub 202 generates impact against the driven hub 203 during engagement, the driven hub 203 can accelerate away from the driving hub 202. If the driving hub 202 is turning fast enough, the drive ball 219 will rise up into the ball chamber 221 and stay there. By adding a reverse ramp, the drive ball 219 cannot rise up during impact and since the ramp is relatively long, it allows the driving hub 202 to catch up to the driven hub 203 and keep the drive ball 219 down where it can wedge between the driving and driven hubs 202,203.

Figure 6:
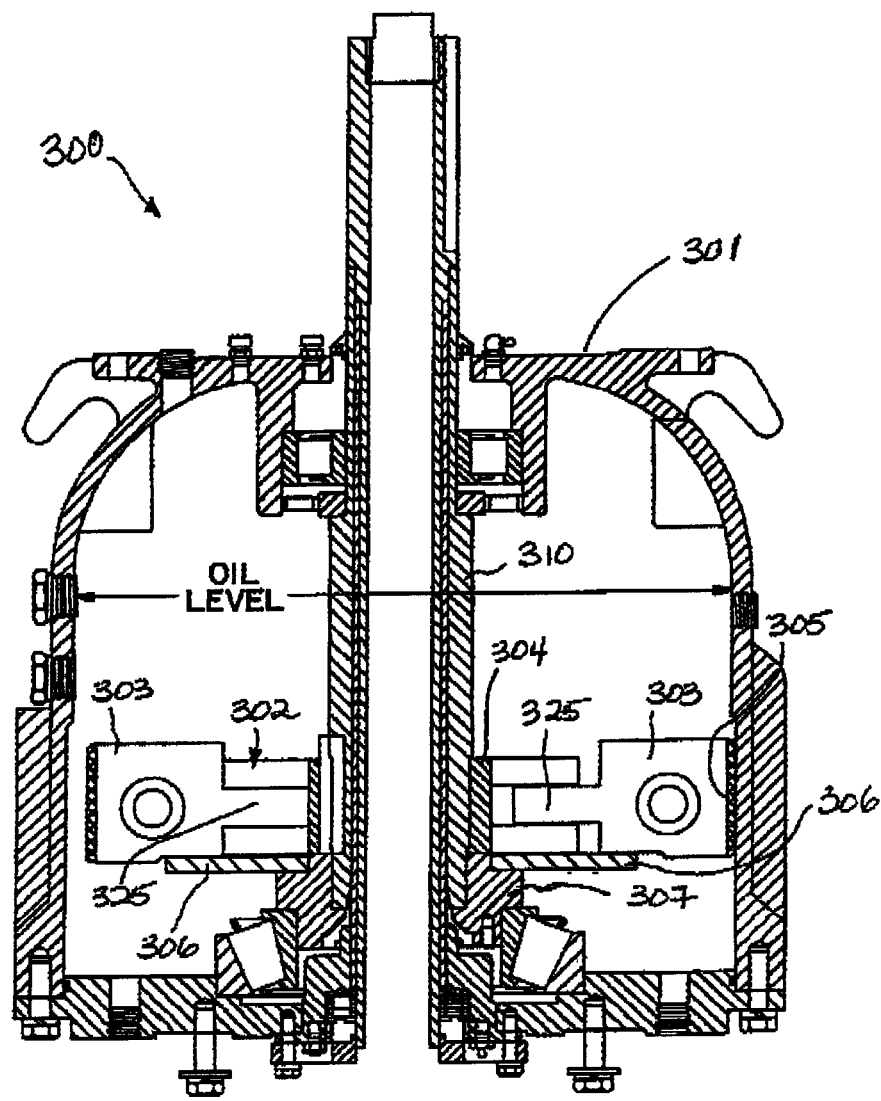
FIGS. 6-8 illustrate a prior art backspin retarder according to U.S. Pat. No. 6,079,489. More particularly.
Figure 7:
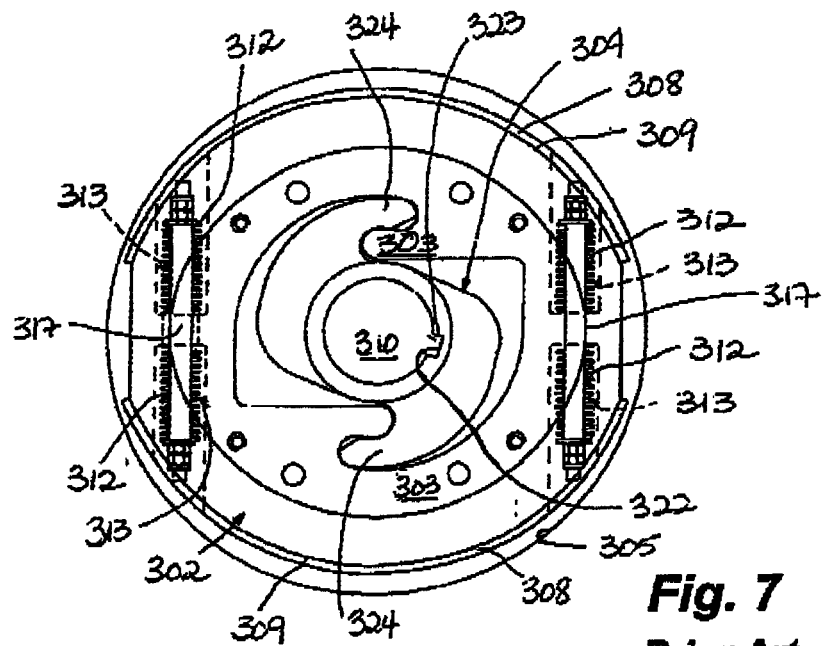
Figure 8:
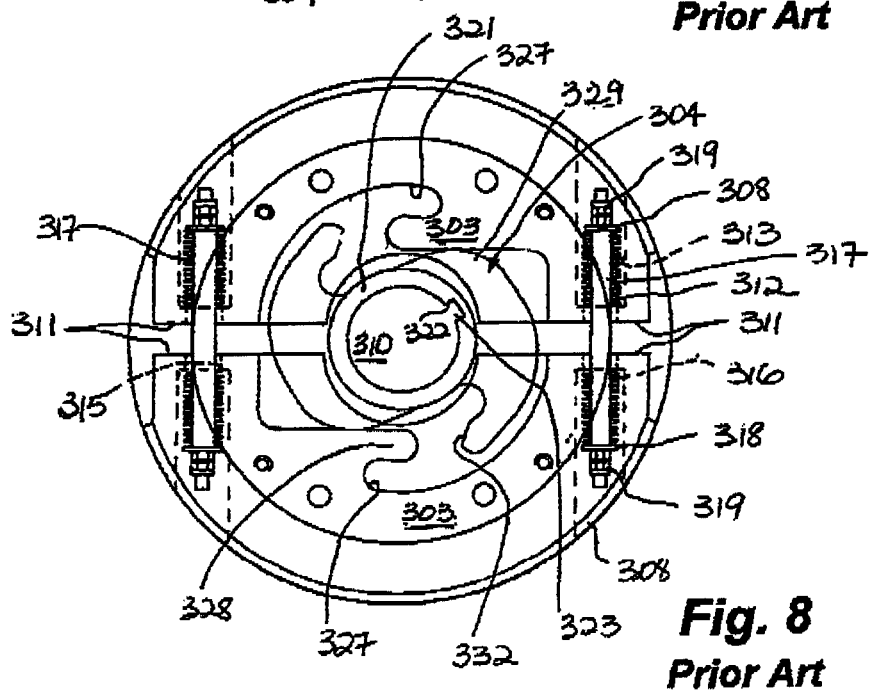

Further, as shown in FIGS. 6-8, and as extracted from Applicant's issued patent U.S. Pat. No. 6,079,489, a centrifugal brake mechanism 300 acts directly on a brake housing 301. The prior art embodiment provides a backspin retarder 302 having two or more weighted movable brake members 303 which are biased toward an inner inactive or disabled position, and which, during forward rotation of the drive shaft, are retained in the inner position and which, during reverse rotation of the drive shaft, are permitted to move radially outwardly under the influence of centrifugal force towards and in engagement with housing 301, which serves as a stationary brake member. In addition, during reverse rotation, means are provided for urging the movable brake members into more intimate contact with the stationary brake member. Retarder 302 is seen to be comprised of a pair of opposed, movable brake members or brake shoes 303, a brake actuator, generally designated by reference numeral 304, and a stationary brake member 305, which in this embodiment, is the inner surface of the housing 301.

The prior art brake members 303 are axially supported by an annular support plate 306 mounted on bearing spacer 307. The support plate 306 is preferably made of a bearing material to prevent galling of the brake shoes and serves as a rotatable bearing for the bearing spacer 307. The function of the shoe support plate 306 is to support the shoes 303 such that they do not vertically rest on the brake actuator 304 so that, in turn, the inertia of the shoes 303 will tend to hold the shoes 303 in position while the actuator 304 rotates from the forward, disengaged direction to the reverse, engaged direction. The brake shoes 303 are generally semi-circular in shape and having a brake lining 308 affixed to their respective outer circular faces 309 for engagement with the inner surface of the housing 302.

The prior art brake shoes 303 are radially movable with respect to the axis of shaft 310 between an inner, retracted position shown in FIG. 7 and an outer braking position shown in FIG. 8. The generally planar, inner edges 311 of the brakes shoes 303 abut one another in the retracted position to limit the degree of travel, balance the shoes 303 during forward rotation and reduce oil-circulation in this non-braking position. The brake shoes 303 are biased towards the inner, retracted position by compression springs 312. To that end, each brake shoe 303 is formed with holes 313 which open into inner edges 314 and which parallel the direction of movement of the brake shoes 303. The holes 313 include a reduced diameter portion 315 defining an annular shoulder 316. The holes 313 are aligned as shown to receive a spring retaining rod 317. The springs 312 are telescopically mounted on the opposite ends of the rod 317 with their inner ends bearing against shoulder 316 and their outer ends bearing against a washer 318 and jam nuts 319. In the absence of centrifugal force sufficient to overcome the force of the springs 312, the springs 312 will urge the brake shoes 303 towards their inner, retracted positions shown in FIG. 7. Brake actuator 304 has two primary roles. The first is to positively retain the brake shoes 303 in their retracted positions during forward rotation of the drive shaft 310 which, in FIGS. 7 and 8, is in the clockwise direction. The second role of the actuator 304 is to urge the brake shoes 303 into more intimate contact with the stationary brake member 305 during reverse rotation of the shaft 310 by applying an additional radial outward force against the brake shoes 303.

The prior art actuator 304 is formed with a cylindrical hub 321 having a keyway 322 for receiving a key 323 formed in the shaft 310. Thus, the actuator 304 rotates with the shaft 310. The actuator 304 is further formed with a pair of opposed, latching fingers 324, one finger associated with each brake shoe 303. The latching fingers 324 are bifurcated to receive a portion 325 of reduced thickness of the brake shoes 303 which define latching finger cavities 327 and projection 328. The cavities 327 receive the end of a latching finger 324 for interlocking the actuator 304 and brake shoes 303 during forward rotation. In addition, the latching fingers 324 are each formed with a cam surface 329 on the side thereof remote from the axis of the shaft 310. When the shaft 310 rotates in a counter-clockwise backwards direction, the cam surfaces 329 act upon planar surfaces 331 of the brake shoes 303 and thereby urges the brake shoes 303 radially apart towards and into engagement with the stationary brake member 305. Finally, for resetting the shoes 303, the underside of the tips of the latching fingers 324 are formed with a chamfer 332 which engage the tips of projections 328 and guide the tips of the fingers into cavities 327 when the shaft 310 is restarted in a forward direction so as to ensure that an interlock is achieved. In operation, when the shaft 310 is rotated in a forward direction, the Ups of the latching fingers 324 enter cavities 327 and thereby not only prevent reverse rotation of the brake shoes 303, but retain the shoes 303 in their radially inner, disabled positions and cause the shoes 303 to rotate with the actuator 304 and the shaft 310. If, for any reason, the shaft 310 is caused to rotate in reverse, the actuator 304 will rotate in a counter-clockwise direction with respect to the brake shoes 303 and disengage the shoes 303. This will free the brake shoes 303 to move radially outwardly under centrifugal force towards and into engagement with the stationary brake surface 305. Further, the cam surfaces 329 apply a radial outward force to surfaces 331 of the brake shoes 303 in addition to the centrifugal force. The cams 329 press radially outward while applying tangential (torque) loading to the shoes 303. The radial component of the cam force puts more pressure on the brake shoes 303 and thereby provides more torque than a device which depends only on centrifugal force. The brake retarder 301 provides a brake disengagement mechanism, rather than a brake engagement mechanism, so that the brake 300 is deactivated while operating in the forward direction. This means there is no brake engaging device which could fail to engage and, thus, the brake reliability is enhanced. The brake 300 is activated automatically as soon as the shaft 310 begins to rotate in reverse, subject only to the spring force of the springs 312. As with the previous embodiment, the springs 312 will resist braking unit a predetermined safe shaft speed. Unfortunately, Applicant's prior art retarder 301 is vulnerable to sudden changes in the angular momentum of the actuator 304 and can prematurely actuate.

Embodiments of the Present Invention

Figure 20:
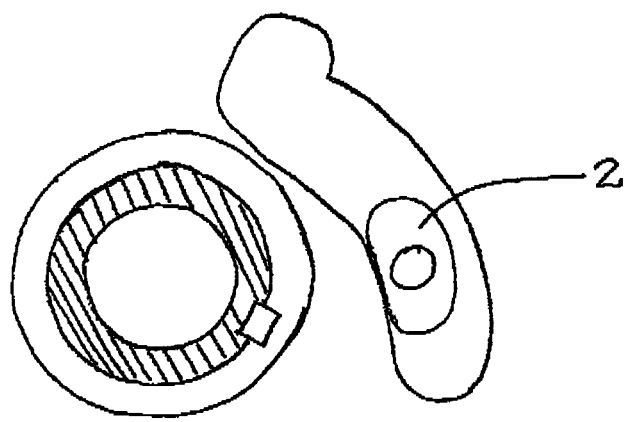
FIG. 20 is a partial plan view according to an embodiment of the invention illustrating a profiled cam follower.

As show in FIGS. 9-17, embodiments of the present centrifugal backspin retarder or braking system 1 comprise a cam arrangement, more particularly in this embodiment, each cam follower 2 extends axially outward from the brake shoe 6 to engage a cam surface 3 formed in a brake hub 11. The cam arrangement acts between the hub 11 and the brake shoes 6 for actuating the brake shoes 6 between the disengaged and engaged positions. As previously described, the cam follower 2 preferably comprises anti-friction members, such as rolling elements 26, typically roller bearings. Due to the rolling elements 26, the friction coefficient is very low and due to the angle σ as described above and shown in FIG. 16, much higher brake multiplier effects can be achieved without locking up. A limiting factor of the braking is the strength of the connection between the cam follower 2 and the brake shoe 6 since a radial force is substantially higher than a tangential braking force due to geometry. A brake multiplier effect of 3.5 or higher can be achieved without locking up the braking system 1 and with application of safe loads on the cam follower 2. In embodiments of the invention the brake multiplier effect ranges from about 3.5 to about 5. Embodiments of the invention make it possible to provide much greater braking force within the same brake drum diameter and length and permit manufacture of much smaller systems, lowering the weight and cost of the wellhead drive and making the drive easier to install. Preferably, the two or more cam followers 2 are substantially circular. Alternately, as shown in FIG. 20, the two or more cam followers 2 may be profiled, such as ovoid or kidney shaped. The profiled follower can pivot.

An embodiment of the invention is shown in FIGS. 9-12. The backspin retarder 1 comprises the brake hub 11 having two or more cam engagement slots 12 formed therein and distributed circumferentially thereabout, each cam engagement slot further comprising the cam surface 3 and an outer guiding surface 13 for directing the brake shoes 6 between an engaged position (FIG. 12) for braking when rotated backwards B, such as under backspin, a disengaged position (FIG. 10) at rest, and an outward disengaged position (FIG. 11) when rotated in a forward direction F at operating speeds for preventing premature engagement.

Each of two or more cam followers 2 comprises a rolling anti-friction bearing or rolling element and extends axially outward from each of the brake shoes 6 for engaging each cam engagement slot 12. The two or more cam followers 2 permit a higher multiplier of centrifugal effect to provide more torque which enables the use of a smaller brake drum diameter as desired, than would be possible with the prior art. The brake shoes 6 are supported axially in the brake hub 11 by antifriction means 14, such as rolling friction bearings or ball transfers, to ensure engagement even under very low acceleration conditions which may occur after the use of variable frequency drive (VFD) braking. Other anti-friction surfaces could be employed.

Figure 9:
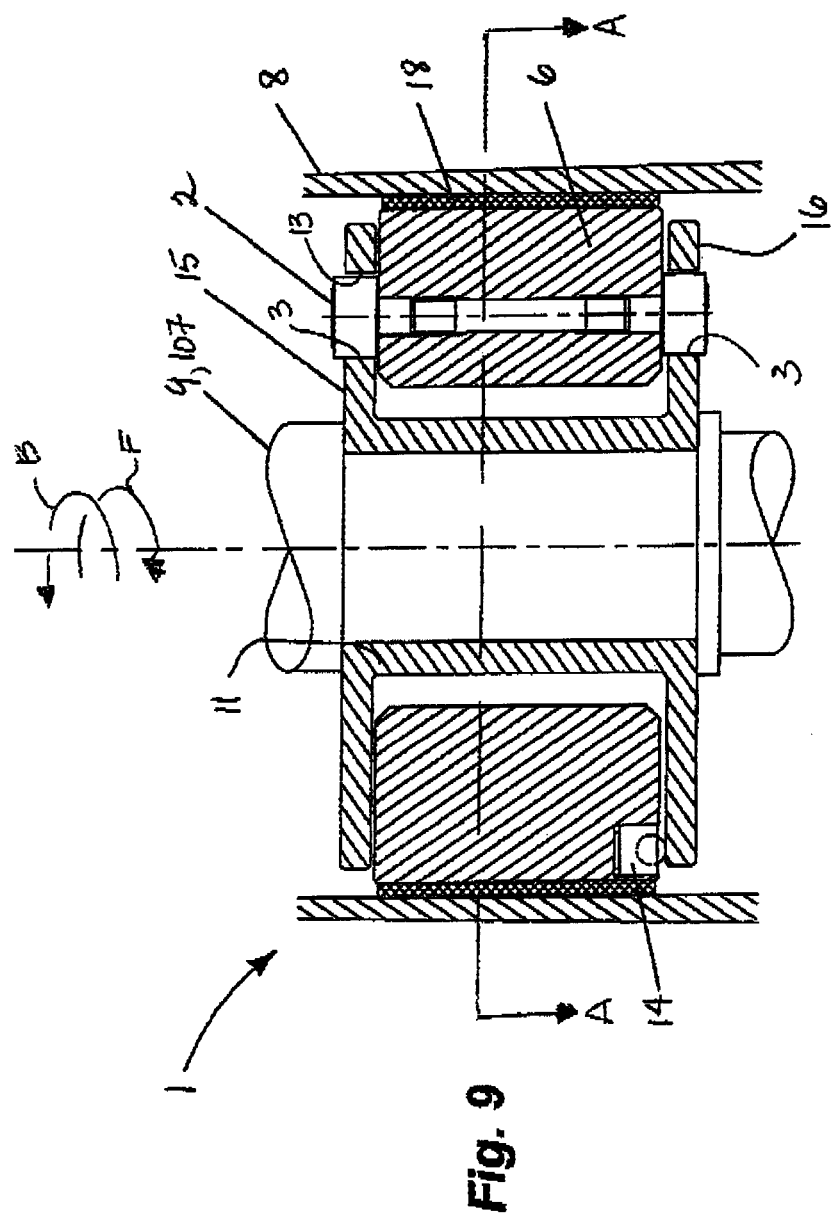
FIG. 9 is a cross sectional side view of an embodiment of the invention.

More particularly, and having reference to FIG. 9, the brake 1 comprises the housing or gear case 8 having the main rotatable shaft 9 extending therethrough. The brake hub 11 is supported for co-rotation with the main shaft 9 and the brake shoes 6 are supported on the brake hub 11. The shaft 9 may be a generic shaft in a housing 8 that requires a clutch or brake arrangement or may be the hollow shaft 9 supporting the polished rod 107, such as shown in FIG. 1.

With reference to FIGS. 9-12, two brake shoes 6,6 are illustrated in diametrically-opposed positions about the hub 11. Optionally, additional brake shoes 6, such as three or four (not shown), may be used being circumferentially distributed about the hub 11. The hub 11 supports upper and a lower radial flanges 15,16. Brake shoes 6,6 are sandwiched between the flanges 15,16. The upper and lower radial flanges 15,16 can incorporate the two or more cam engagement slots 12. Preferably the two or more cam engagement slots 12 are mirrored axially in the upper and lower flanges 15,16.

Each brake shoe 6 further comprises a brake shoe body 17 incorporating cam followers 2,2 extending axially upward and downward therefrom for engagement with the cam engagement slots 12,12 in the upper and lower radial flanges 15,16 respectively. Each brake shoe 6 has a brake pad or lining 18 which engages the housing 8 when the brake 1 is in the engaged braking position. The brake shoes 6,6 are supported in the brake hub 11 by the rolling friction bearings 14 positioned between the shoes 6,6 and the lower radial flange 16.

Figure 10:
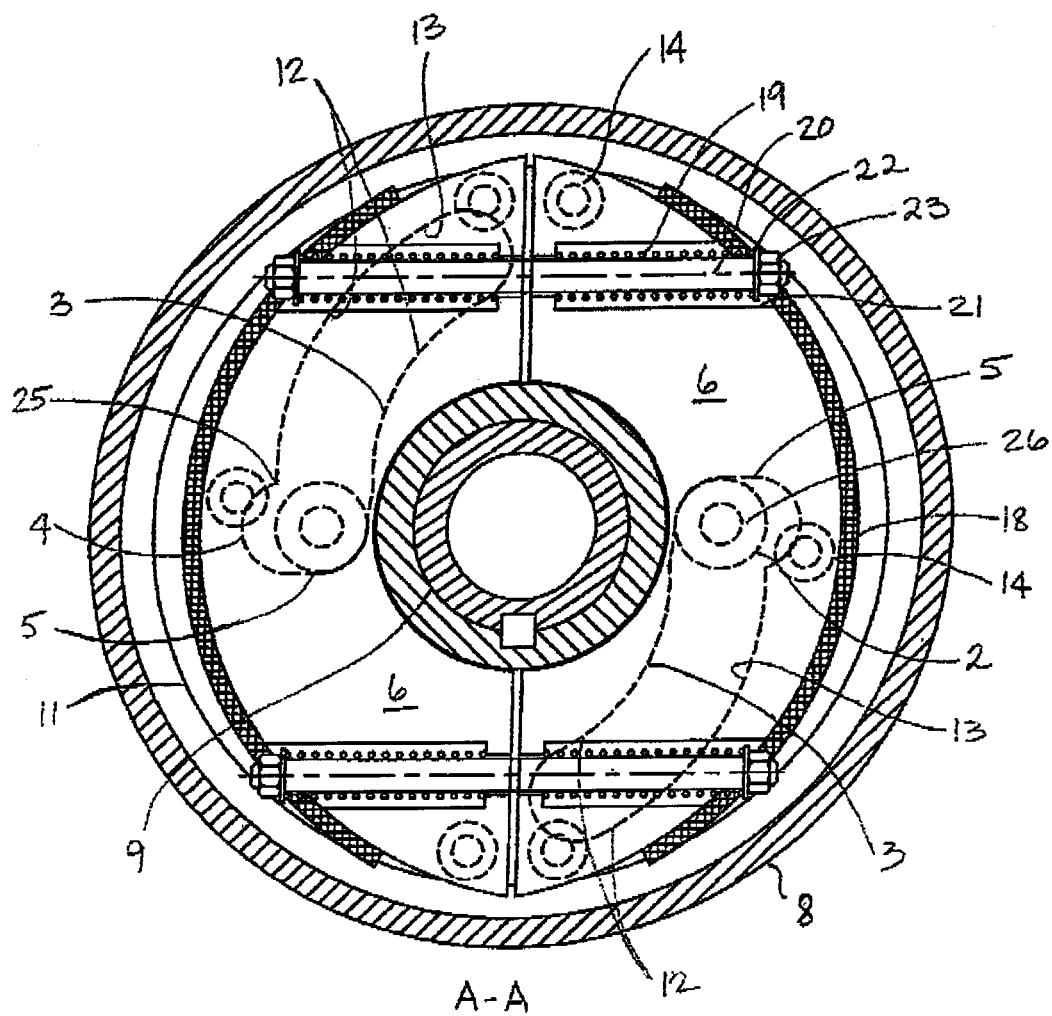
FIG. 10 is top sectional view along section lines A-A according to FIG. 9 and in an embodiment of the invention, the upper hub flange removed and the cam engagement slots illustrated in dotted lines to show the cam follower extending axially from the brake shoes in a non-rotating position.

Having reference to FIG. 10, the brake shoes 6,6 are shown biased to the radially inward, disengaged position in a rest or near resting position. The cam followers 2,2 are biased inward to reside against the radially inward cam surface 3 of the cam engagement slot 12. The brake shoes are biased to the disengaged position by biasing means 19, such as conventional springs, which are connected thereto by tie bolts 20 extending through tie bolt slots 21 and secured with washers 22 and lock nuts 23. Little or no centrifugal forces are present.

The cam engagement slot 12 comprises the radially inward end 5 and a radially outward end 24.

In operation, as first shown and discussed for FIG. 10, when the shaft 9 is rotated slowly in a forward direction, the brake shoes 6,6 and cam followers 2,2 are initially biased radially inwardly by the biasing means 19, each cam follower 2 being positioned adjacent the cam surface 3 of the slot 12.

Figure 11:
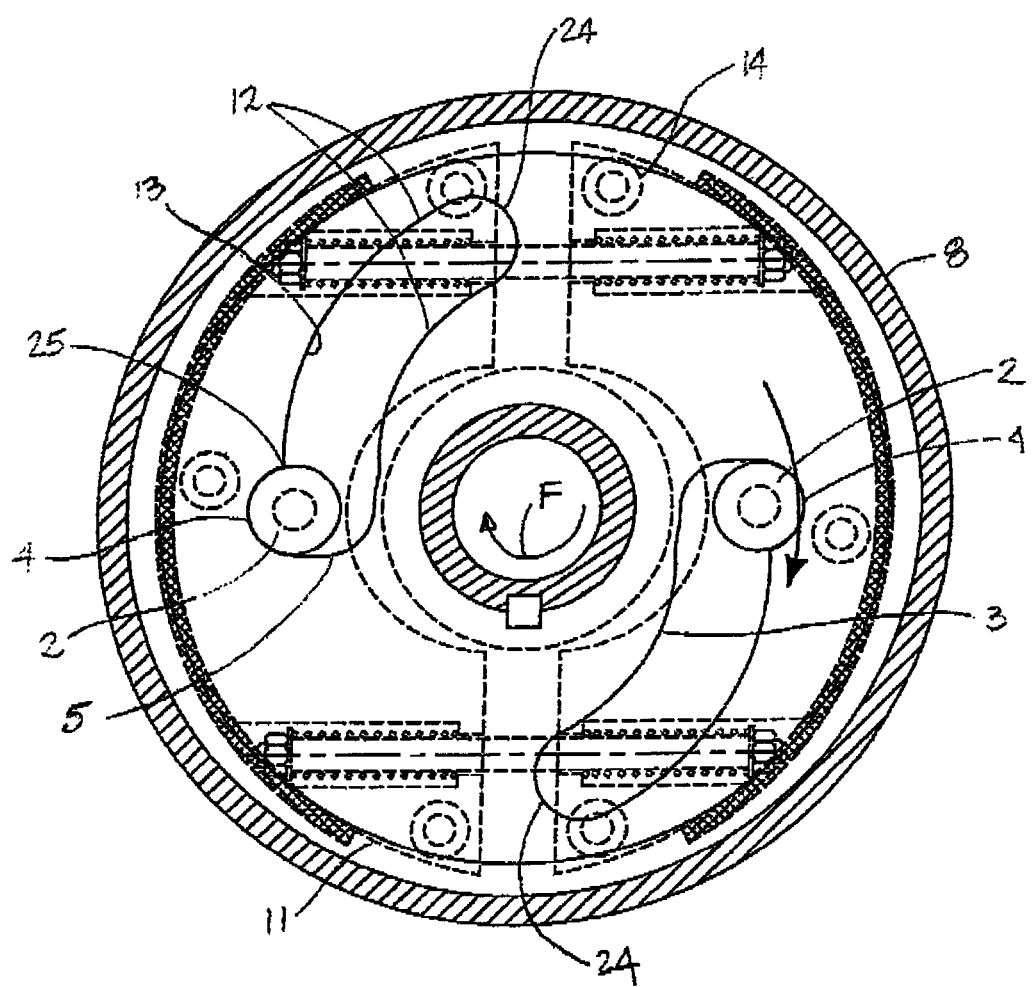
FIG. 11 is a plan view according to FIG. 9 illustrated in a disengaged, disabled position.

As shown in FIG. 11, as the rotation increases to normal operating revolutions per minute (rpm), the brake shoes 6,6 are urged centrifugally outward to overcome the biasing means 19. The pocket 4 is formed at the radial inward end 5 of each cam engagement slot 12 and extends radially outward therefrom for engaging the cam follower 2 and each brake shoe 6 in an outward disengaged position. Each brake shoe 6 and corresponding cam followers 2,2 move radially outward under centrifugal force and each cam follower 2 engages each pocket 4. The brake shoes 6,6 are in the outward disengaged position. The pocket 4 arrests further outward movement of the brake shoes 6,6 and prohibits engagement of the brake lining 18 and housing 8 while permitting the brake shoes 6,6 to co-rotate with the hub 11 and the shaft 9 in the forward direction F. Further, the pocket 4 forms a lip 25 which acts to retain the cam follower 2 in the pocket 4 in instances of abrupt deceleration and changes in angular momentum, which are essentially equivalent to a weak "backspins", which would otherwise, as in the case with the prior art devices, cause each cam follower 2 to move along the cam surface 3 and permit the brake shoes 6,6 to prematurely engage the housing 8. The height of the lip 25 is preferably less than a radius of the cam follower 2 to enable the cam follower 2 to readily actuate during backwards rotation.

As shown in FIG. 12, when the shaft 9 is slowed, stopped and then is caused to rotate backwards, such as when a PCP is turned off and the rod string is permitted to controllably release stored energy, the hub 11 co-rotates with the shaft in a counterclockwise, backwards direction B with respect to the brake shoes 6,6. Initially, as the hub 11 transitions from forward F to backwards B rotation, each cam follower 2 is biased to disengage from each pocket 4 and enter each slot 12. During the backspin, centrifugal force drives the brake shoes 6,6 outwardly, overcoming the spring biasing 19 and the cam followers 2,2 engage the cam surface 3 of the cam engagement slots 12. Backwards rotation B of the hub 11 and slot 12, drives the cam followers 2 to move toward the radially outward end 24 of the slot 12, forcing the brake shoes 6,6 outward to engage the brake lining 18 with the housing 8. Thereafter, the cam engagement slots 12 continue to drive the cam followers 2,2 outwardly urging the brake shoes 6 and lining 18 into engagement with the housing 8 proportional to the centrifugal force. Due to the angle σ of the cam follower 2 relative to the shaft 9, brake multiplier effects in the order of about 3.5 to about 5 are applied without locking up of the brake system 1 and permitting desired dissipation of the stored energy in the rod string or shaft 9. The outer guiding surface 13 can aid in proper alignment of the cam follower 2 with the cam surface 3 and return to the pocket 4 as the braking system moves from the engaged braking position to the rest position or disabled position. This may be of particular importance if the PCP is turned off and then turned on again before the shaft and hub have stopped rotating and stored energy has been dissipated.

Figure 13:
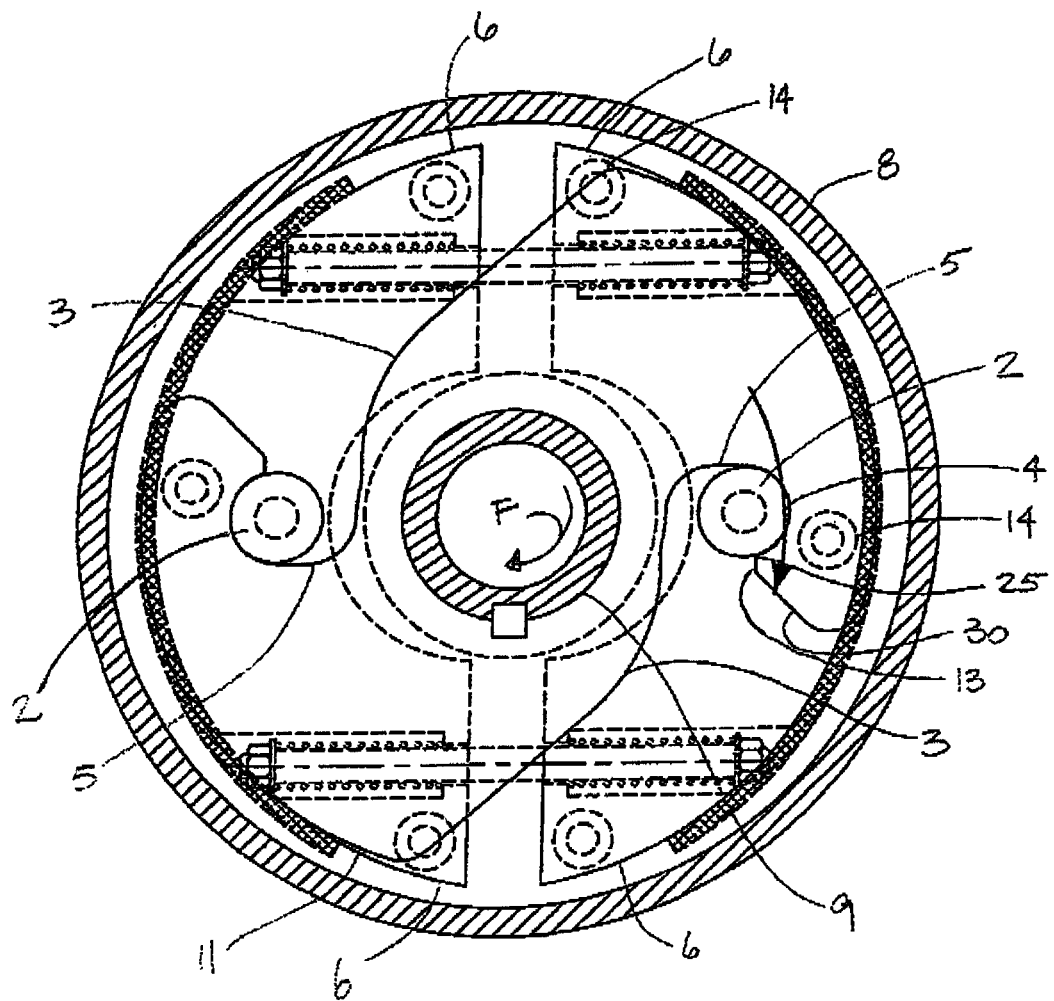
FIG. 13 is a plan view according to FIG. 9 and in an embodiment of the invention, an outer cam engaging surface being discontinuous, the brake shoes illustrated in a disengaged, disabled position.

Having reference to FIG. 13, and in an embodiment of the invention, the outer guiding surface 13 is a discontinuous surface comprising a ramp 30 formed adjacent the pocket 4 for aiding in re-engagement of the cam follower 2 with the cam surface 3 and the pocket 4. In this embodiment the shaft 9 must be permitted to come to a stop before restarting rotation in the forward direction F to prevent improper engagement of the cam follower 2 with the ramp 30, which may prevent engagement of the cam follower 2 with the pocket 4. Failure to properly engage the cam follower 2 with the pocket results in an inability of the brake shoes 6,6 to move inward to the outward disengaged position during normal forward rotation resulting in brake drag and overheating of the brake system 1.

Figure 16:
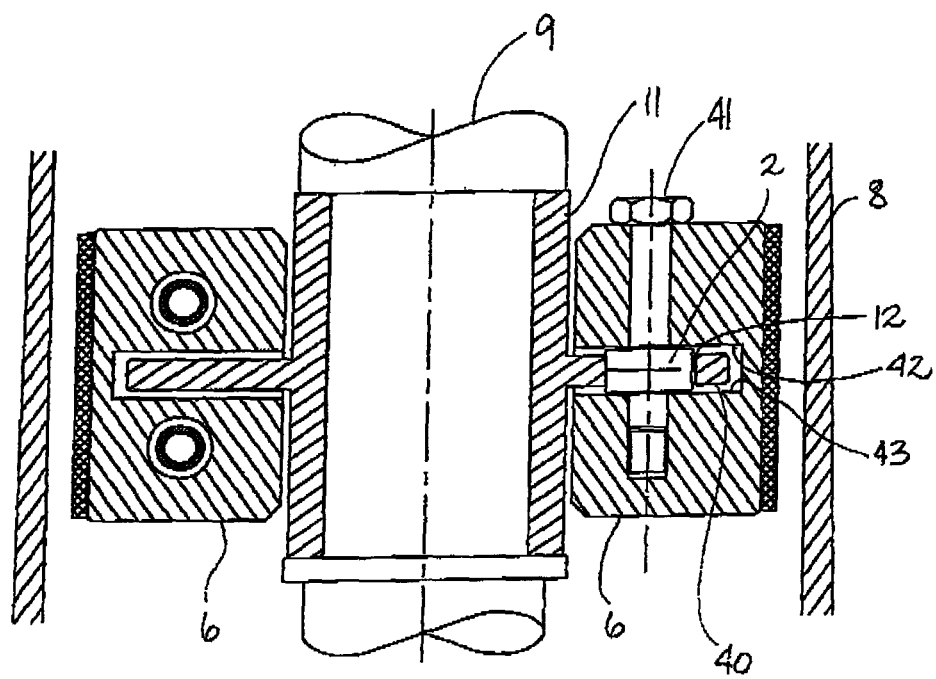
FIG. 16 is a cross sectional side view along section lines B-B of an embodiment of the invention wherein the hub has a central flange.
Figure 17:
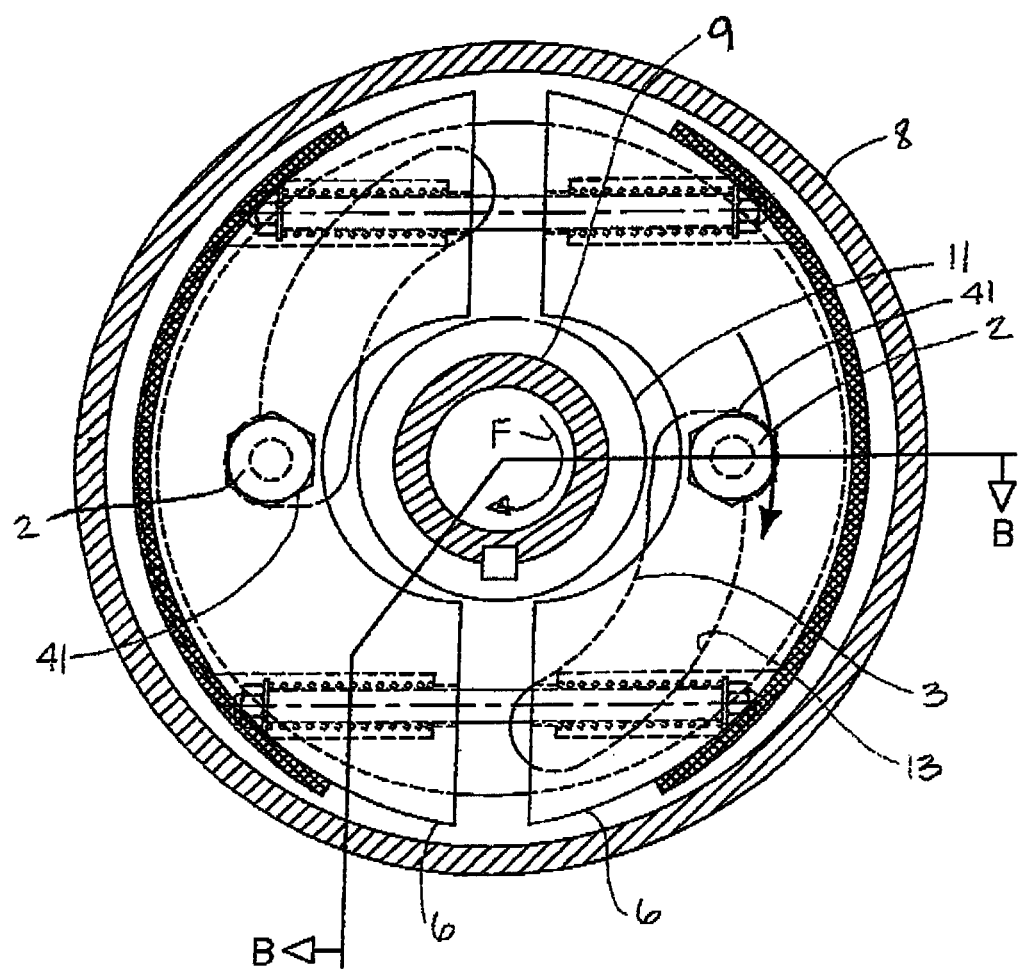
FIG. 17 is a plan view according to FIG. 16.

Having reference to FIGS. 16 and 17, and in an embodiment of the invention, the hub 11 is formed having a central flange 40 rather than upper and lower flanges 15, 16. In this embodiment, the brake shoes 6 are supported around the central flange 40. A cam engagement slot 12 is formed in the central flange 40 and a cam follower 2 is supported in the cam engagement slot 12, such as by a fastener 41, which extends between upper and lower brake shoe surfaces 42,43. The brake shoes 6,6 may be supported on the central flange 40 by anti-friction means 14, such as rolling anti-friction bearings.

Figure 15:
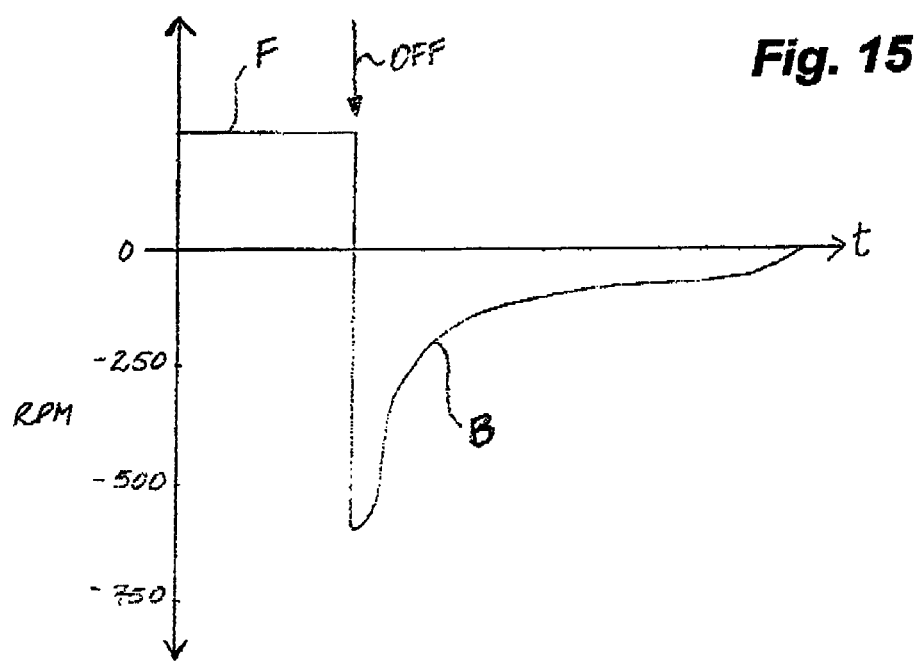
FIG. 15 is a graphical representation illustrating a desired dissipation of energy from a rod string.

Having reference to FIG. 15, in normal pumping operation, the hub 11 can rotate at typical speeds of between 50 and 200 rpm. As shown, when the pump is turned off, the forward rotation F quickly reverses to a backwards rotation B as the energy of the sucker rods is released. The centrifugal force restrains the backspin to about 500-700 rpm and diminishes as the energy is dissipated. Further, as the hydraulic head of fluid in the production tubing diminishes, the backwards rotation B diminishes also to 0 rpm.

Figure 18:
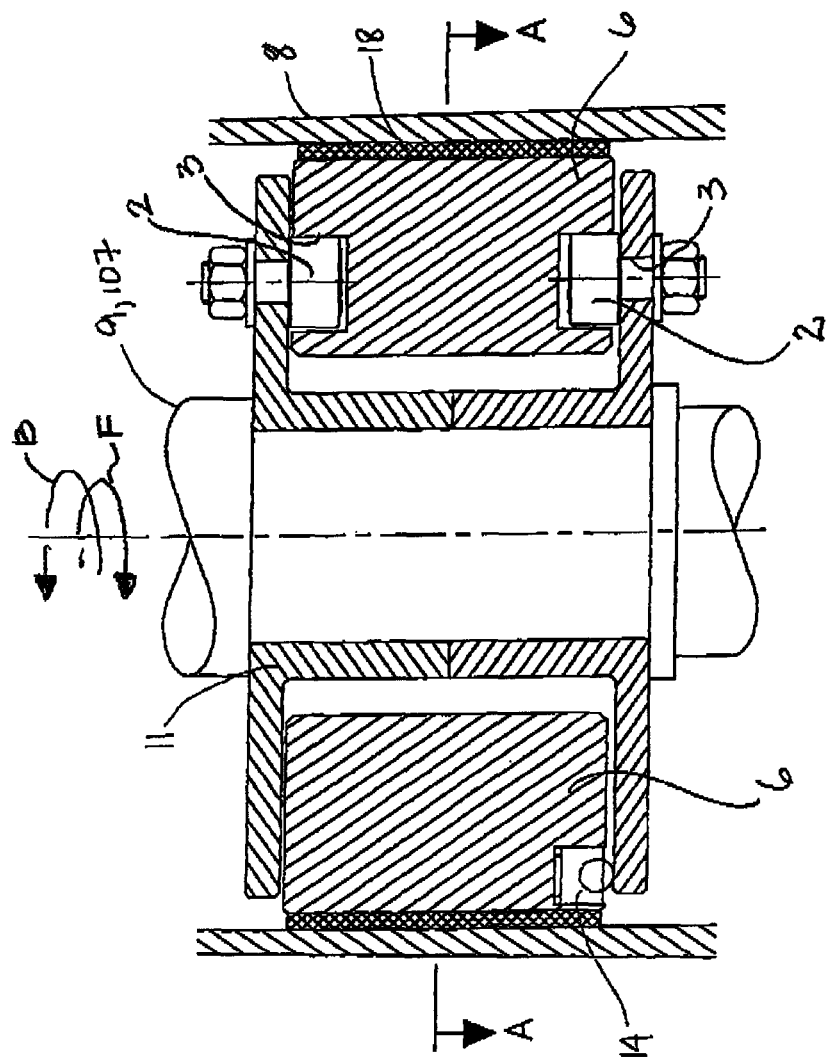
FIG. 18 is a cross sectional side view of an embodiment of the invention wherein the cam surfaces are formed in the brake shoes and the cam followers extend from the hub for engagement therewith.
Figure 19:
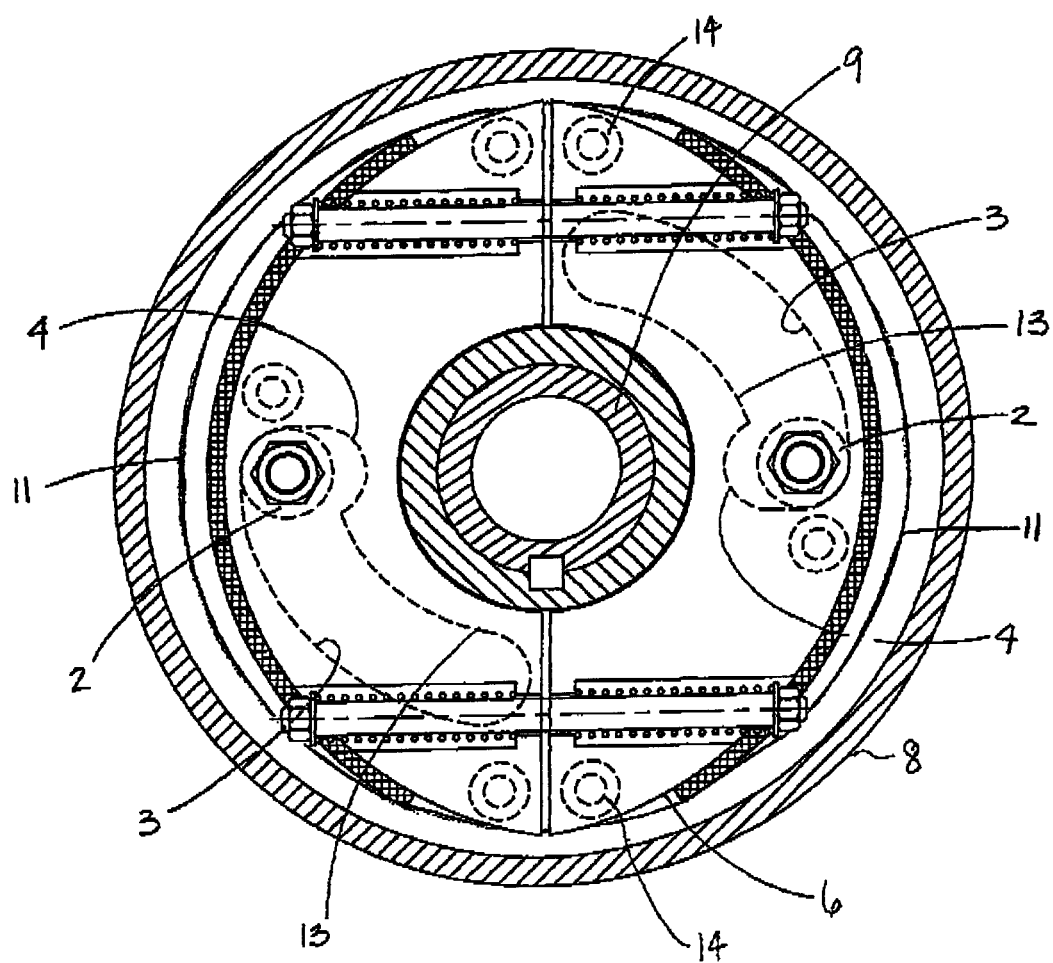
FIG. 19 is a top sectional view according to FIG. 18.

As one of skill in the art will appreciate, and as shown in FIGS. 18 and 19, the cam surface 3 or cam engagement slot 12 can be formed in the brake shoes 6,6, and the cam followers 2 can extend from the hub 11 for engagement therewith. In order to actuate the brake shoes 6 between the disengaged and engaged position the pocket 4 is formed at the radially outward end 24 of slot 12 and the pocket 4 extends radially inwardly.

The embodiments of the invention in which an exclusive property or privilege is claimed are defined as follows:

1. A centrifugal brake system for retarding backspin comprising:
    a main rotatable shaft extending axially through a brake housing;
    a hub supported for co-rotation by the shaft and rotatable concentrically in the brake housing;
    two or more brake shoes supported by and distributed circumferentially about the hub, each brake shoe movable radially outwardly under the influence of centrifugal force, between a biased, radially inward disengaged position, the brake shoes retained thereat when the shaft, hub and the two or more brake shoes rotate in a forward direction, and an engaged position in braking engagement with the brake housing, when the shaft, hub and the two or more brake shoes rotate in a backwards direction under the influence of centrifugal force; and
    a cam arrangement acting between the two or more brake shoes and the hub comprising:
        two or more arcuate cam surfaces extending circumferentially between a radially inward end and a radially outward end; and
        two or more cam followers, each cam follower engaging each cam surface for actuating and retaining the brake shoes at the radially inward end in the radially inward disengaged position during rotation in the forward direction and to move toward the radially outward end to the engaged position during rotation in the backward direction.

2. The brake system of claim 1 wherein the two or more cam followers are substantially circular.

3. The brake system of claim 1 wherein the two or more cam followers are profiled.

4. The brake system of claim 1 wherein the two or more cam followers further comprise anti-friction members for engaging the cam surface.

5. The brake system of claim 4 wherein the anti-friction members are rolling element bearings for rolling engagement with the cam surface.

6. The brake system of claim 1 wherein the circumferentially distributed brake shoes are axially supported on the hub by anti-friction means.

7. The brake system of claim 1 wherein the hub further comprises a hub flange, the circumferentially distributed brake shoes are axially supported between the hub flange and the brake shoes by anti-friction means.

8. The brake system of claim 1 wherein when the shaft transitions between the forward direction and the backward direction, the brake shoes bias inwardly and each cam follower engages each cam surface at the disengaged position.

9. The brake system of claim 1 wherein the two or more cam surfaces are formed on the hub and the two or more cam followers extend axially outwardly from the two or more brake shoes.

10. The brake system of claim 1 further comprising two or more cam slots comprising the two or more cam surfaces and two or more substantially parallel guiding surfaces.

11. The brake system of claim 1 wherein each brake shoe is centrifugally retained in the disengaged position within a radially extending pocket.

12. The brake system of claim 11 wherein each pocket forms a lip for retaining each cam follower therein.

13. The brake system of claim 1 wherein each cam follower further comprises anti-friction members, each cam follower and each cam surface forming a cam angle sufficient to provide a brake multiplier greater than 3.5.

14. The brake system of claim 13 wherein the brake multiplier is from about 3.5 to about 5.0.

15. The centrifugal brake system of claim 13 wherein the cam angle is about 15 degrees.

16. The centrifugal brake system of claim 11 wherein each substantially parallel guiding surface is discontinuous and further comprises:
    a ramp positioned adjacent the radially extending pocket for guiding each cam follower to the disengaged position.

17. The brake system of claim 1 wherein the brake hub further comprises:
    a central tubular conduit through which the main driven rotatable shaft extends; and
    a hub flange extending radially outward from the central tubular conduit for supporting the brake shoes thereon,
    wherein the cam arrangement acts between the brake shoes and the hub flange.

18. The centrifugal brake system of claim 17 further comprising anti-friction means acting between the brake shoes and the hub flange.

19. The brake system of claim 1 wherein the hub further comprises upper and lower hub flanges, the two or more circumferentially distributed brake shoes being supported therebetween,
    wherein the two or more cam surfaces are circumferentially distributed about each of the upper and lower hub flanges; and
    the two or more cam followers extend axially from a top and a bottom surface of each of the circumferentially distributed brake shoes for engaging the two or more cam surfaces.

20. The brake system of claim 19 further comprising a radially outward pocket formed at the radially inward end of each cam surface.

21. The brake system of claim 1 wherein the hub further comprises upper and lower hub flanges, the two or more circumferentially distributed brake shoes being supported therebetween,
    wherein the two or more cam surfaces are circumferentially distributed about each of the two or more circumferentially distributed brake shoes; and
    the two or more cam followers extend axially from the upper and lower hub flanges for engaging the cam surfaces.

22. The brake system of claim 21 further comprising a radially inward pocket formed at the radially outward end of each cam surface.

23. The centrifugal brake system of claim 19 further comprising anti-friction means acting between the brake shoes and the lower hub flange.

24. A method for retarding backspin in a centrifugal brake system having a main rotatable shaft extending axially through a brake housing, a hub supported for co-rotation by the shaft and rotatable concentrically in the brake housing and two or more brake shoes distributed circumferentially about the hub, the co-rotating shaft, hub and two or more brake shoes being rotatable in a forward and a backwards direction, the method comprising:

biasing the two or more brake shoes inwardly to the hub;

rotating the hub in the forward direction to centrifugally overcome the biasing and actuate each of the two or more brake shoes to move radially outward under the influence of centrifugal force towards an outward, disengaged position;

centrifugally retaining each of the two or more brake shoes at a cam surface in the outward, disengaged position during rotation of the hub in the forward direction;

slowing rotation of the hub in the forward direction to transition to rotation in the backward direction causing biasing of the two or more brake shoes inwardly from the cam surface;

rotating the hub in the backward direction; and actuating the two or more brake shoes under the influence of centrifugal force along the cam surface to an engaged position by camming the two or more brake shoes outwardly into braking engagement with the brake housing during the rotation in the backward direction.

25. The method of claim 24 wherein the camming further comprises driving a cam follower, operatively connected to the brake shoes, circumferentially and radially outwardly to the engaged position in the backward direction.

26. The method of claim 25 further comprising:

guiding the cam follower circumferentially and radially inwardly to the disengaged position in the forward direction.

* * * * *